(12) United States Patent
Yang

(10) Patent No.: US 8,310,660 B2
(45) Date of Patent: Nov. 13, 2012

(54) METHOD AND SYSTEM FOR CALIBRATING A MULTIPLE-BEAM CURVATURE/FLATNESS SENSOR

(75) Inventor: Ming Yang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 431 days.

(21) Appl. No.: 12/724,857

(22) Filed: Mar. 16, 2010

(65) Prior Publication Data

US 2011/0228282 A1     Sep. 22, 2011

(51) Int. Cl.
*G01N 21/00* (2006.01)
*G01N 21/86* (2006.01)

(52) U.S. Cl. ........ 356/71; 356/444; 356/435; 250/559.1
(58) Field of Classification Search .......... 356/71, 356/432–435; 250/559.1
See application file for complete search history.

(56) References Cited

U.S. PATENT DOCUMENTS

| | | | |
|---|---|---|---|
| 4,926,538 A | 5/1990 | Bond et al. | |
| 4,931,659 A * | 6/1990 | Sabater et al. | 250/559.1 |
| 6,668,155 B1 | 12/2003 | Hubble, III et al. | |
| 6,774,986 B2 * | 8/2004 | Laskowski | 356/71 |
| 7,283,240 B2 * | 10/2007 | Mestha et al. | 356/402 |
| 7,545,519 B2 * | 6/2009 | Ossman et al. | 356/625 |
| 7,548,316 B2 * | 6/2009 | Castillo et al. | 356/406 |
| 2008/0018913 A1 | 1/2008 | Ossman et al. | |
| 2009/0003896 A1 | 1/2009 | Domoto et al. | |

\* cited by examiner

*Primary Examiner* — Layla Lauchman
(74) *Attorney, Agent, or Firm* — Kermit D. Lopez; Luis M. Ortiz; Ortiz & Lopez, PLLC

(57) ABSTRACT

A method and system for calibrating a multiple-beam curvature/flatness sensor in order to provide an accurate media curvature/flatness measurement. One or more flat media sheets are passed through a multiple-beam media curvature/flatness sensor and the timing data associated with the lead edge/trail edge crossing each beam associated with the multiple beam curvature/flatness sensor is used for the calibration of the curvature/flatness sensor system. The unknown variables in the media curvature/flatness equation which takes into consideration of the manufacture and assembly errors of the sensor as well as the media deflection due to gravity can be determined and eliminated in order to obtain a calibrated media curvature/flatness equation. The calibrated media curvature/flatness equation can further be applied in the curvature/flatness measurement in order to achieve accurate measurement results.

20 Claims, 3 Drawing Sheets

METHOD AND SYSTEM FOR CALIBRATING A MULTIPLE-BEAM CURVATURE/FLATNESS SENSOR

TECHNICAL FIELD

Embodiments are generally related to rendering devices such as printers, multi-function devices, photocopy machines, fax machines, and the like. Embodiments are also related to media curl/flatness detection sensors employed in the context of rendering devices and associated systems and methods. Embodiments are additionally related to the calibration of a multiple-beam media curvature/flatness sensor.

BACKGROUND OF THE INVENTION

Media curl is frequently considered one of the root causes of paper jams and registration errors during rendering, and can be exacerbated by high-density images and plural color rendering issues. Media curl can be induced by several factors such as, for example, relative humidity, paper weight, paper size, number of sides imaged, or the amount of data contained with a particular digital image.

Sheet curling can occur even in the context of unprinted sheets of paper due to changes in ambient humidity or the moisture content of the paper. Sheet curling interferes with proper sheet feeding, thereby causing sheet feeding jams, delays or registration errors. Sheet curling can cause media to come into direct contact with printing cartridges and damage the cartridges. If sheet curl is present in the output, it can interfere with proper stacking or other finishing operations. Furthermore, the amount of moisture in a sheet of paper can drastically change from the rendering process itself, which can cause or exacerbate curl.

Sheet curl problems can also occur in duplex printing, when the sheets are re-fed or re-circulated for rendering imaging material on their second sides, especially if this involves a second pass of the sheet through a thermal fuser and/or the presence of higher density images on one side than the other. The media curl must be measured and controlled so that reliable marking can be achieved and damage to the ink cartridge prevented.

Various media curl/flatness sensors and control systems are known in the electro photographic rendering arts. Such prior art systems typically employ a multiple-beam sensor such as, for example, a single cross beam sensor or a dual cross beam sensor for detecting the height/curl/flatness of the media. Such beam sensors and their precise placement with respect to the nips, transport belts, and media introduces opportunity for variability of the sensor response characteristics. For example, the nip need to be perfectly aligned with the cross beam sensor center and the media need to be shot out perfectly straight in order to achieve high measurement accuracy. Such assumptions make the manufacture and assembly errors very difficult to achieve.

Based on the foregoing, it is believed that a need exists for an improved method and system for calibrating a multiple-beam media curvature/flatness sensor to achieve high measurement accuracy without extreme requirement on the sensor manufacturing and assembling tolerance, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved lead edge and trail edge media curvature/flatness sensor system and method.

It is another aspect of the disclosed embodiments to provide for an improved multiple-beam media curvature/flatness sensor system and method.

It is a further aspect of the disclosed embodiments to provide for an improved method and system for calibrating the multiple-beam media curvature/flatness sensor.

The aforementioned aspects and other objectives and advantages can now be achieved as described herein. A method and system for calibrating a multiple-beam media curvature/flatness sensor in order to provide an accurate media curvature/flatness measurement is disclosed. One or more flat media sheets (e.g., paper, photo media, printing media, etc) can be passed through and sensed by the multiple-beam curvature/flatness sensor (e.g., a single cross beam or a dual cross beam sensor). The timing data, when the lead edge/trail edge hits all of the beams of the multiple beam sensor, will be recorded. Such data can be utilized to eliminate unknown variables in the media curvature height (tip height) equation. The unknown variables in the equation include the angle at which the media are shot out from the previous or the next nip, the misalignment between the nip center and the beam cross center, and the media deflection due to gravity. After these unknown variables are eliminated, a calibration equation can be achieved from the media curvature height (tip height) equation. Such a calibrated media curvature (tip height) equation can be applied in the curvature/flatness measurement in order to achieve accurate measurement results. Such a calibration approach makes the sensor errors in manufacture and assembly less critical to the media curvature/flatness measurement and requires neither the transport nip to be perfectly aligned with the cross beam sensor center nor the media to be shot out perfectly straight.

The media enters the multiple-beam media curvature sensor on a left side or right side and proceeds via a series of drive and nips, transport belts or baffles during which the lead edge/trail edge curl/flatness signal can be obtained. The multiple-beam media curvature/flatness sensor has a comparatively low cost of construction. The detectors can be provided on either side of the media path and aligned to receive the light beams from the emitters located on the other side of the media path. Since the misalignment between the point of intersection of the cross beams, the center of the transport nip (for lead edge measurement, the nip is the nip upstream of the cross beam sensor, and for trail edge, it is the nip downstream), and the nip angle can be eliminated from the curvature/flatness (tip height) equation based on this disclosed calibration method, an accurate media curvature measurement can be achieved even when manufacture and assembly errors exist. Such an approach does not require the nip to be perfectly aligned with the cross beam sensor center and it does not require the sheet shot out perfectly straight thereby it eliminates/relaxes the requirements on the sensor manufacture and assembly tolerances without negatively affecting the curvature/flatness measurement accuracy.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
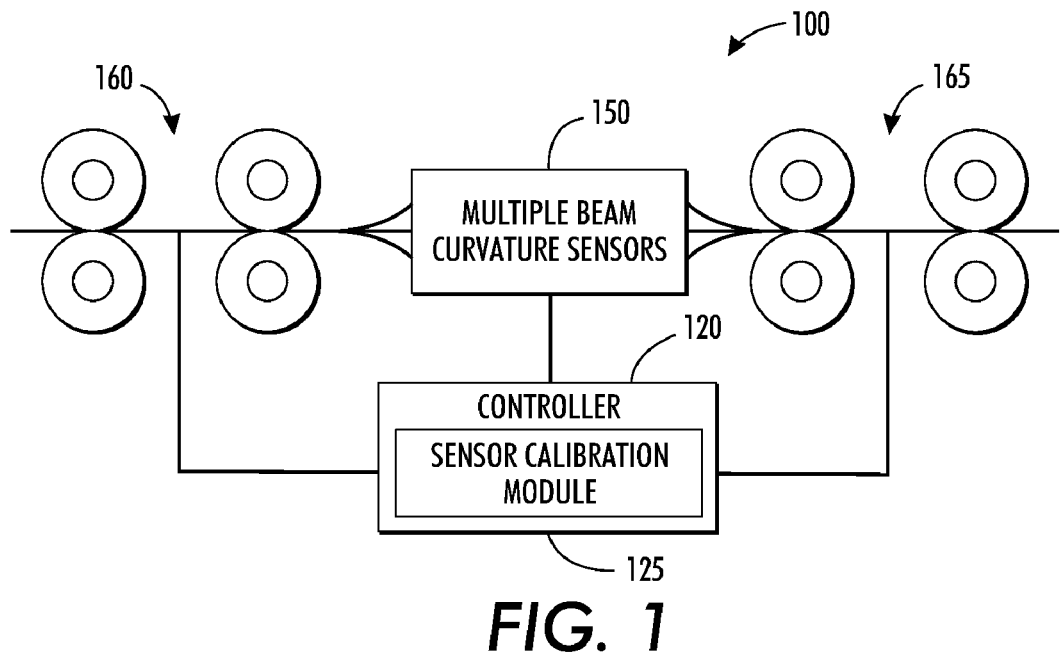
FIG. 1 illustrates a block diagram of a multiple-beam (e.g., single cross, dual cross, etc.) curvature/flatness sensor calibration system, in accordance with the disclosed embodiments.

FIG. 1 illustrates a block diagram of a multiple-beam (single, dual cross, etc.) curvature/flatness sensor calibration system 100, in accordance with the disclosed embodiments. The multiple-beam curvature/flatness sensor calibration system 100 can be implemented for calibrating the multiple-beam (single or dual cross, etc.) curvature/flatness sensor 150 so that high measurement accuracy can be achieved even without extreme requirement on the sensor manufacturing and assembling tolerance. The multiple-beam sensor 150 is to measure the leading edge and/or the trail edge curl height/flatness of a transport media substrate in a marking engine such as paper or transparencies in a marking rendering device. Note that as utilized herein, the term rendering device may refer to an apparatus or system such as a printer, fax machine, copy machine, etc., and/or a combination thereof.

The calibration sensor system 100 generally includes a lead edge constraint 160, a trail edge constraint 165, and the multiple-beam curvature/flatness sensor 150 associated with a controller 120. Note that the multiple-beam curvature/flatness sensor 150 can be, for example, a single cross beam sensor or a dual cross beam sensor, depending upon design considerations. The controller 120 further includes a sensor calibration module 125 which can be configured to calibrate the multiple-beam curvature sensor 150 in order to provide an accurate media curvature/flatness measurement.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The multiple-beam sensor 150 can be employed to measure the media curvature (e.g., media curl or flatness) and to adjust the media curvature/flatness accordingly in order to avoid paper jams and other registration errors. One or more flat media sheets (e.g., paper, photo media printing media, etc.) can be passed through the lead edge constraint 160 or the trail edge constraint 165 and sensed by the multiple-beam curvature sensor 150. The timing data associated with the lead edge/trail edge when they hit each cross beam of the multiple-beam curvature sensor 150 can be recorded. The sensor calibration module 125 eliminates the unknown variables associated with the media curvature/flatness equation using these timing data so that an exact form of the curvature/flatness equation, which takes into consideration of the manufacture and assembly errors, can be employed in the curvature/flatness measurement in order to achieve accurate results.

Figure 2:
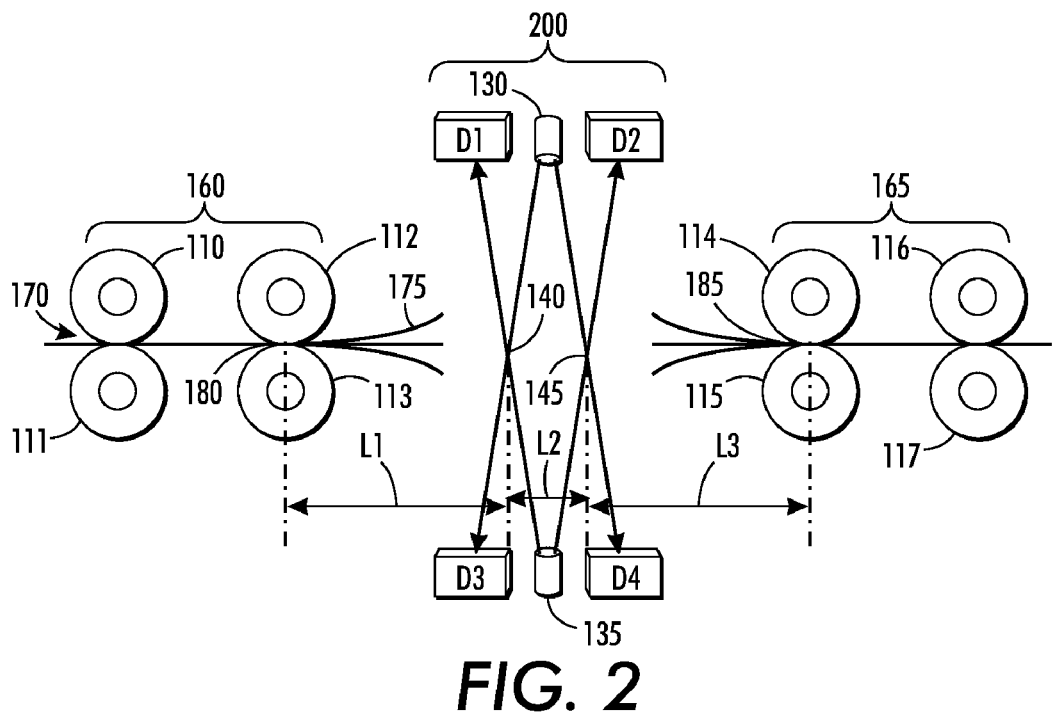
FIG. 2 illustrates a schematic diagram of a dual cross beam sensor calibration system, in accordance with the disclosed embodiments.

FIG. 2 illustrates a schematic diagram of a dual cross beam sensor 200 associated with the lead edge constraint 160 and the trail edge constraint 165, in accordance with the disclosed embodiments. Note that in FIGS. 1-4, identical or similar parts are generally indicated by identical reference numerals. The lead edge constraint 160 further includes rollers 110 and 111, which can be positioned on opposite sides of a media path 170 in order to drive a media 175 towards the multiple beam sensor 150. Additionally, constraint rollers 112 and 113 can be positioned between the rollers 110 and 111 and the multiple beam sensor 150. The media 175 travels between the constraint rollers 112 and 113. The term 'media' generally refers to sheets of paper or other material receiving marking images. For reference, the media may be described as having a leading edge, referring to the edge of the paper first to exit a nip or other transport element in the rendering device. The edge of the paper last to leave a nip or other transport element in the rendering device is called the trailing edge.

The trailing edge constraint 165 functions in a manner that is similar to the lead edge constraint 160. The trailing edge constraint 165 holds the media 175 as it exits the multiple beam sensor 150 such that the trailing edge curl/flatness of the media 175 can be accurately measured. The trailing edge constraint 165 includes the rollers 116 and 117 positioned on opposite sides of the media path 170 wherein the media 175 can be pulled forward after exiting the multiple beam sensor 150. Between the multiple beam sensor 150 and the rollers 116 and 117 are positioned the trailing edge constraint rollers 114 and 115. The media 175 enters the multiple beam sensor 150 on a left side or a right side and proceeds through a series of drive and nips, transport belts, or baffles (not shown). The lead edge constraint 160 constrains the edge of the substrate media 175 such that the curl sensor 150 is able to accurately measure the sheet media curl/flatness. The process direction of the substrate media 175 is indicated by arrow 170 in FIG. 1.

A dual cross beam sensor 200 can be configured to include two emitters 130 and 135 that can be disposed on the opposite sides of the transport media path 170. The emitters 130 and 135 can be employed to generate a pair of beams to form dual cross point 140 and 145. Located above and below the transport media path 170 are the four detectors D1, D2, D3 and D4 which monitor the beams emitted by the emitters and report the time when the beams changed status from blocked to unblocked or from unblocked to blocked due to media passage.

A lead edge/trail edge curl signal can be measured as the media 175 passes the dual cross beam sensor 200 positioned sequentially in the media path 170. A dual cross beam sensor 200 includes one pair (or two pairs) of emitters 130 and 135 and four detectors D1, D2, D3 and D4 positioned sequentially in the media path 170 so that a media 175 passes via the dual cross beams. Note that there are four beams in the dual cross sensor system. The emitters 130 and 135 can be disposed on the opposite sides of the transport media path 170. The light emitter 130 can be aligned such that a light beam emitted is directed towards the detectors D3 and D4. The light emitter 135 can be aligned such that an emitted light beam is directed towards the detectors D1 and D2.

The dual cross beam sensor 200 operates by measuring any time difference between interruptions of the light beams from the light emitters 130 and 135 as detected at the detectors D1, D2, D3 and D4. The media 175 traveling on the transport path 170 with zero curl of the leading edge can pass through the light beams of the dual cross sensor 200 from the light emitters 130 and 135, interrupting the light beams sensed at the detectors D1, D2, D3 and D4. The media 175 with the positive curl of the leading edge can interrupt the light beams from the light emitters 130 and 135 as sensed at detectors D1, D2, D3 and D4. Similarly, media 175 with a negative leading edge curl will also interrupt the light beam from the light emitter 130 and 135 as sensed at the detectors D1, D2, D3 and D4. The time differences of the interruptions differ as the amount of curl of the media changes.

Figure 3:
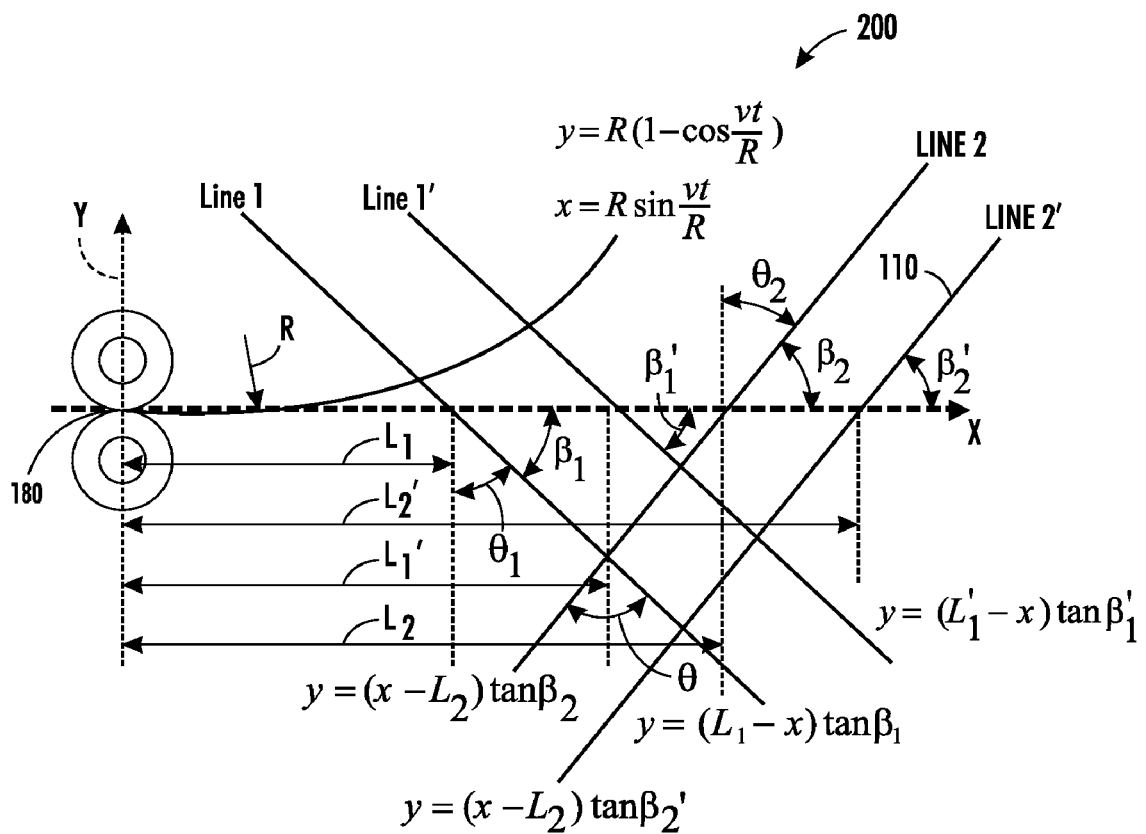
FIG. 3 illustrates a schematic diagram of the dual cross beam sensor for calculating a calibrated media curvature tip height, in accordance with the disclosed embodiment.

FIG. 3 illustrates a schematic diagram of a dual cross beam sensor 200 for calculating a calibrated media curvature/flatness, in accordance with the disclosed embodiment. Note that the embodiments discussed herein generally relate to the dual cross beam sensor 200. It can be appreciated, however, that such embodiments can be implemented in the context of a single cross beam sensor or other multiple-beam sensor, and are not limited to the dual cross beam sensor 200. The discussion of dual cross beam sensor, as utilized herein, is presented for general illustrative purposes only.

The timing data with respect to the media 175 can be measured as the media 175 passes each of the multiple beams, as an example, all 4 beams in a dual cross beam sensor. The media curvature/flatness can be calculated from using the timing data when the lead edge/trail edge hits each beam. Note that as utilized herein the term "media curvature" can refer to a curled height and/or a media tip height. The media curvature can be measured each time the media 175 cross the dual cross beam sensor 150 and an average of the media curvature measurements from the two crosses can be calculated to achieve more accurate media tip height representation. Using the multiple beam sensor, the simplified media curvature can be represented, as indicated in equation (1) as follows:

$$\bar{y} = \frac{L^2}{2R} = \frac{v(t_2 - t_1)}{2\tan\theta/2} \quad (1)$$

wherein L represents the distance between the nip center and the beam cross center (140 or 145), $t_1$ and $t_2$ represents the time readings when the media edge crosses the dual beams of a single cross, v represents the media speed, and θ represents the angle between the dual beams of the single cross used in calculation. To make this equation hold, an assumption must be made that the nip is straight, i.e. the media must be shot out straight, the sensor beam cross must be aligned perfectly with the nip center, and less importantly, the media deflection due to gravity should be negligible. These assumptions make the manufacture and assembly tolerances very difficult to achieve. The actual media curvature of the media crossing a single cross beam sensor 150 (although either the pair of Line 1 and 2 or the pair of Line 1' and 2' may be used as the dual beams of a single cross), the following analysis is based on the dual beam combined by the pair of Line 1 and 2. If the dual beam based on the pair of Line 1' and 2' is used, the variables used in the analysis should be replaced by the corresponding prime variables, for example, $L_1$ should be replaced with $L_1'$ when manufacture and assembly errors exist and can be represented, as indicated in equation (2) as follows:

$$\bar{y} = \frac{L^2}{2R} - \frac{w_a L^4}{8EI} + L\tan\gamma \quad (2)$$
$$= \frac{(L_1 - L_2) + v(t_2 - t_1)}{\tan(\pi/2 - \beta_1) + \tan(\pi/2 - \beta_2)}$$

The timing data associated with line 1, 1', 2, and 2' as illustrated in FIG. 3, can be represented as $t_1$, $t_1'$, $t_2$, and $t_2'$, respectively. $L_1$ and $L_2$ represents the x coordinators where line 1 and 2 intersect with the x axis [L=(L1+L2)/2], and $\beta_1$ and $\beta_2$ represents the intersecting angles, $w_a$ represents the paper gravity load, EI represents paper bending stiffness, and γ represents the nip angle, i.e. the angle at which paper is shot out from the nip. When manufacture and assembly errors exist, equation (2), instead of equation (1) should be used to achieve accurate results on the media curvature/flatness measurement and how to determine/eliminate the unknown variables in equation (2) is one objective of this disclosed invention. The unknown variables associated with the media curvature (tip height) equation (2) can be determined and eliminated by the calibration method disclosed below. One or more flat media sheets (e.g., paper, photo media, printing media, etc) can be passed through and sensed by the multiple-beam curvature/flatness sensor (e.g., a single cross beam or a dual cross beam etc.). The timing data $t_{1f}$, $t_{1f}'$, $t_{2f}$, and $t_{2f}'$ when the lead edge/trail edge hits each of the multiple beam sensor will be recorded. These data are used to eliminate unknown variables in the media curvature/curl height equation (2). For example, the distance from the nip 180 to a point of intersection of the cross beams with respect to the media path $L_1$-$L_2$ and a nip angle can be eliminated from the curvature equation (2). Consider the flat sheet of media is crossing the dual beams at time $t_{1f}$ and $t_{2f}$ and as the height of the flat media is 0, Equation (2) can be represented as follows:

$$L_1 - L_2 = \quad (3)$$
$$-v(t_{2f} - t_{1f}) + 1\left(-\frac{w_{af}L^4}{8E_f I_f} + L\tan\gamma\right)[\tan(\pi/2 - \beta_1) + \tan(\pi/2 - \beta_2)]$$

wherein $w_{af}$ represents the gravity load, and $E_f I_f$ represents the bending stiffness of the flat media 175. The equation (2) can be rewritten, by using equation (3), as shown in equation (4).

$$\bar{y} = \frac{L^2}{2R} - \frac{w_a L^4}{8EI} + L\tan\gamma \quad (4)$$
$$= \frac{v[(t_2 - t_1) - (t_{2f} - t_{1f})]}{\tan(\pi/2 - \beta_1) + \tan(\pi/2 - \beta_2)} - \frac{w_{af}L^4}{8E_f I_f} + L\tan\gamma$$

The calibrated curvature/flatness (tip height) equation can be, therefore, defined by the following equation (5):

$$\frac{L^2}{2R} = \frac{v[(t_2 - t_1) - (t_{2f} - t_{1f})]}{\tan(\pi/2 - \beta_1) + \tan(\pi/2 - \beta_2)} - \left[\frac{w_{af}L^4}{8E_f I_f} - \frac{w_a L^4}{8EI}\right] \approx \quad (5)$$
$$\frac{v[(t_2 - t_1) - (t_{2f} - t_{1f})]}{2\tan\theta/2} - \left[\frac{w_{af}L^4}{8E_f I_f} - \frac{w_a L^4}{8EI}\right]$$

The calibrated curvature equation (5) can be employed to determine the accurate media curl of a media sheet. Such an approach neither requires the nip to be perfectly aligned with the cross beam sensor center nor requires the sheet shot out perfectly straight. Therefore, such a calibration eliminates/relaxes the requirements on the sensor manufacture and assembly tolerances without negatively affecting the curvature/flatness measurement accuracy.

Figure 4:
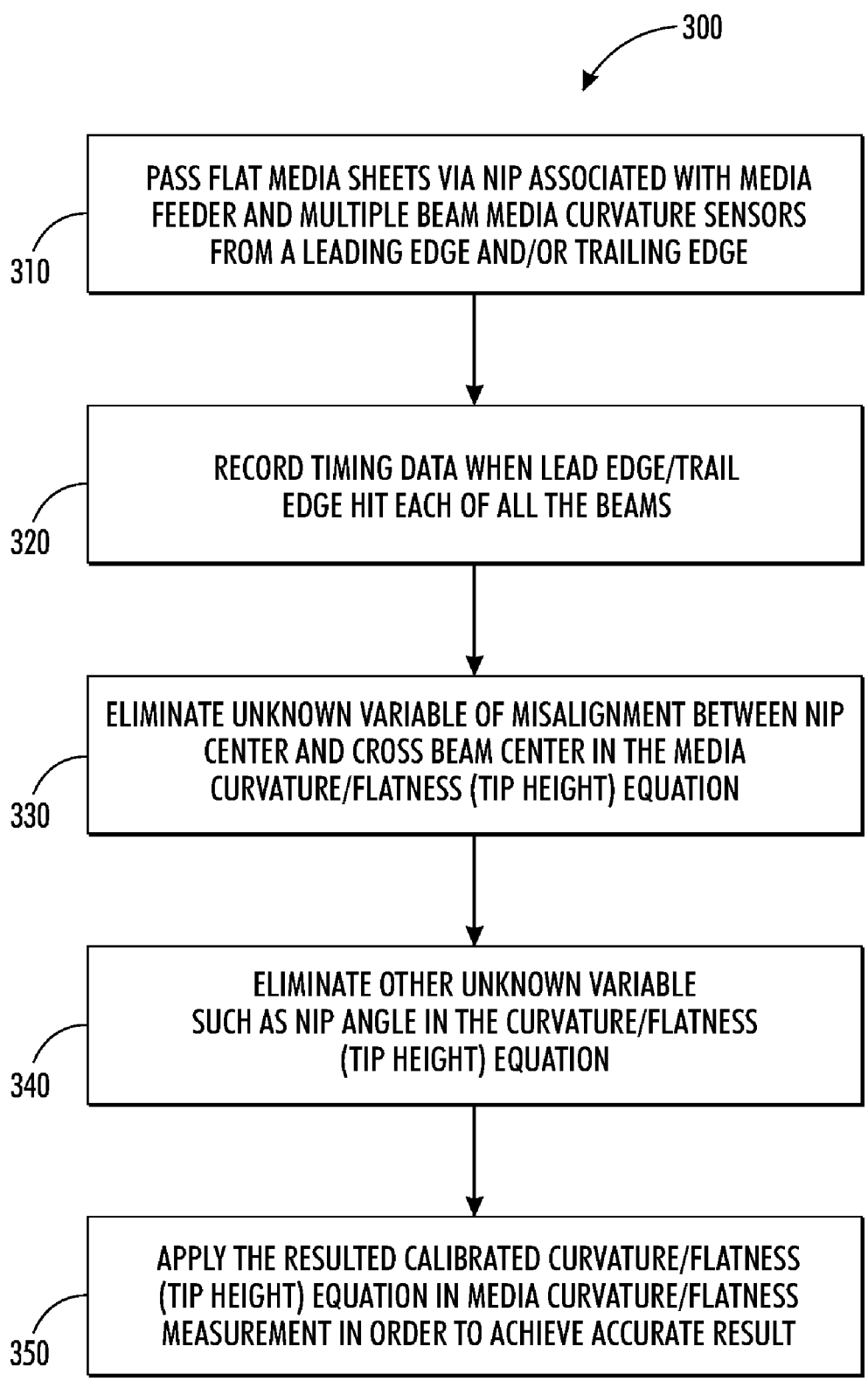
FIG. 4 illustrates a high level flow chart of operations illustrating logical operational steps of a method for calibrating the multiple-beam curvature sensor in order to provide an accurate media curvature/flatness measurement, in accordance with the disclosed embodiments.

FIG. 4 illustrates a high level flow chart of operations illustrating logical operational steps of a method 300 for calibrating the multiple-beam curvature/flatness sensor 150 in order to provide an accurate media curvature/flatness measurement, in accordance with the disclosed embodiments. The flat media sheets 175 can be passed through the disclosed calibrated sensor system and sensed by the multiple-beam curvature/flatness sensor 150, as illustrated at block 310. The timing data associated with the lead edge/trail edge with respect to each cross beam associated with multiple-beam curvature sensor 150 can be recorded, as indicated at block 320. The unknown variables and nip angle associated with the media curvature equation can be determined and eliminated using the timing data gained in the flat media sheet calibration in order to obtain calibrated media curvature/flatness equation, as depicted at blocks 330 and 340. The form of the curvature/flatness equation (2) which includes the effects of the manufacture and assembly error as well as the media deflection due to gravity can be applied in the curvature/flatness measurement in order to achieve an accurate result, as illustrated at block 350. Such a calibration approach makes the sensor errors in manufacture and assembly less critical to the media curvature measurement.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for calibrating a multiple-beam media curvature/flatness sensor, said method comprising:
   transmitting at least one flat media sheet via a multiple-beam curvature/flatness sensor in order to detect a configuration of said sensor;
   recording timing data with respect to at least one edge of the said at least one flat media sheet as said at least one flat media sheet crosses each beam of said multiple-beam curvature/flatness sensor; and
   calibrating said multiple-beam curvature/flatness sensor to obtain a calibrated media curvature/flatness equation in order to thereafter apply said calibrated media curvature/flatness equation, which takes into consideration manufacture and assembly errors of said sensor as well as media deflection due to gravity in a curvature/flatness measurement and achieve an accurate result.

2. The method of claim 1 wherein calibrating said multiple-beam curvature/flatness sensor further comprises:
   determining and eliminating at least one unknown variable associated with said configuration of said multiple beam media curvature/flatness sensor; and
   determining and eliminating said at least one unknown variable in said curvature/flatness equation associated with manufacture and assembly errors of the said multiple beam media curvature/flatness sensor, thereby ensuring that errors in manufacture and assembly are less critical to an accuracy of said media curvature/flatness measurement.

3. The method of claim 1 further comprising determining and eliminating a media deflection due to gravity from said curvature/flatness equation via calibrating said multiple-beam curvature sensor.

4. The method of claim 1 further comprising measuring said media speed and said media curvature/flatness as said at least one flat media sheet crosses via said multiple-beam curvature/flatness sensor from a leading edge.

5. The method of claim 1 further comprising measuring said media speed and said media curvature/flatness as said at least one flat media sheet crosses via said multiple-beam curvature/flatness sensor from a trailing edge.

6. The method of claim 1 further comprising configuring said multiple-beam curvature/flatness sensor to comprise at least one emitter and at least one detector.

7. The method of claim 1 wherein said multiple-beam curvature/flatness sensor comprises a single cross beam sensor.

8. The method of claim 1 wherein said multiple-beam curvature/flatness sensor comprises a dual cross beam sensor.

9. A system for calibrating a multiple-beam media curvature sensor, system comprising:
   a multiple-beam curvature/flatness sensor, wherein at least one flat media sheet is transmitted via said multiple-beam curvature/flatness sensor in order to detect a configuration of said sensor;
   a recorder for recording timing data with respect to at least one edge of the said at least one flat media sheet as said at least one flat media sheet crosses each beam of said multiple-beam curvature/flatness sensor; and
   a calibrator for calibrating said multiple-beam curvature/flatness sensor to obtain a calibrated media curvature/flatness equation in order to thereafter apply said calibrated media curvature/flatness equation, which takes into consideration manufacture and assembly errors of said sensor as well as media deflection due to gravity in a curvature/flatness measurement and achieve an accurate result.

10. The system of claim 9 wherein said calibrator for calibrating said multiple-beam curvature/flatness sensor:
    determines and eliminates at least one unknown variable associated with said configuration of said multiple beam media curvature/flatness sensor; and
    determines and eliminates said at least one unknown variable in said curvature/flatness equation associated with manufacture and assembly errors of the said multiple beam media curvature/flatness sensor, thereby ensuring that errors in manufacture and assembly are less critical to an accuracy of said media curvature/flatness measurement.

11. The system of claim 9 wherein said calibrator further determines and eliminates a media deflection due to gravity from said curvature/flatness equation via calibrating said multiple-beam curvature sensor.

12. The system of claim 9 further comprising a measurement mechanism for measuring said media speed and said media curvature/flatness as said at least one flat media sheet crosses via said multiple-beam curvature/flatness sensor from a leading edge.

13. The system of claim 9 further comprising a measurement mechanism for measuring said media speed and said media curvature/flatness as said at least one flat media sheet crosses via said multiple-beam curvature/flatness sensor from a trailing edge.

14. The system of claim 9 wherein said multiple-beam curvature/flatness sensor comprises at least one emitter and at least one detector.

15. The system of claim 9 wherein said multiple-beam curvature/flatness sensor comprises a single cross beam sensor.

16. The system of claim 9 wherein said multiple-beam curvature/flatness sensor comprises a dual cross beam sensor.

17. A system for calibrating a multiple-beam media curvature sensor, system comprising:
- a multiple-beam curvature/flatness sensor, wherein at least one flat media sheet is transmitted via said multiple-beam curvature/flatness sensor in order to detect a configuration of said sensor;
- a recorder for recording timing data with respect to at least one edge of said at least one flat media sheet as said at least one flat media sheet crosses each beam of said multiple-beam curvature/flatness sensor; and
- a calibrator for calibrating said multiple-beam curvature/flatness sensor to obtain a calibrated media curvature/flatness equation in order to thereafter apply said calibrated media curvature/flatness equation, which takes into consideration manufacture and assembly errors of said sensor in a curvature/flatness measurement and achieve an accurate result, and wherein said calibrator:
  - determines and eliminates at least one unknown variable associated with said configuration of said multiple beam media curvature/flatness sensor; and
  - determines and eliminates said at least one unknown variable in said curvature/flatness equation associated with manufacture and assembly errors of said multiple beam media curvature/flatness sensor, thereby ensuring that errors in manufacture and assembly are less critical to said media curvature/flatness measurement.

18. The system of claim 17 wherein said multiple-beam curvature/flatness sensor comprises at least one emitter and at least one detector.

19. The system of claim 17 wherein said multiple-beam curvature/flatness sensor comprises a single cross beam sensor.

20. The system of claim 17 wherein said multiple-beam curvature/flatness sensor comprises a dual cross beam sensor.

* * * * *